Patented Apr. 25, 1939

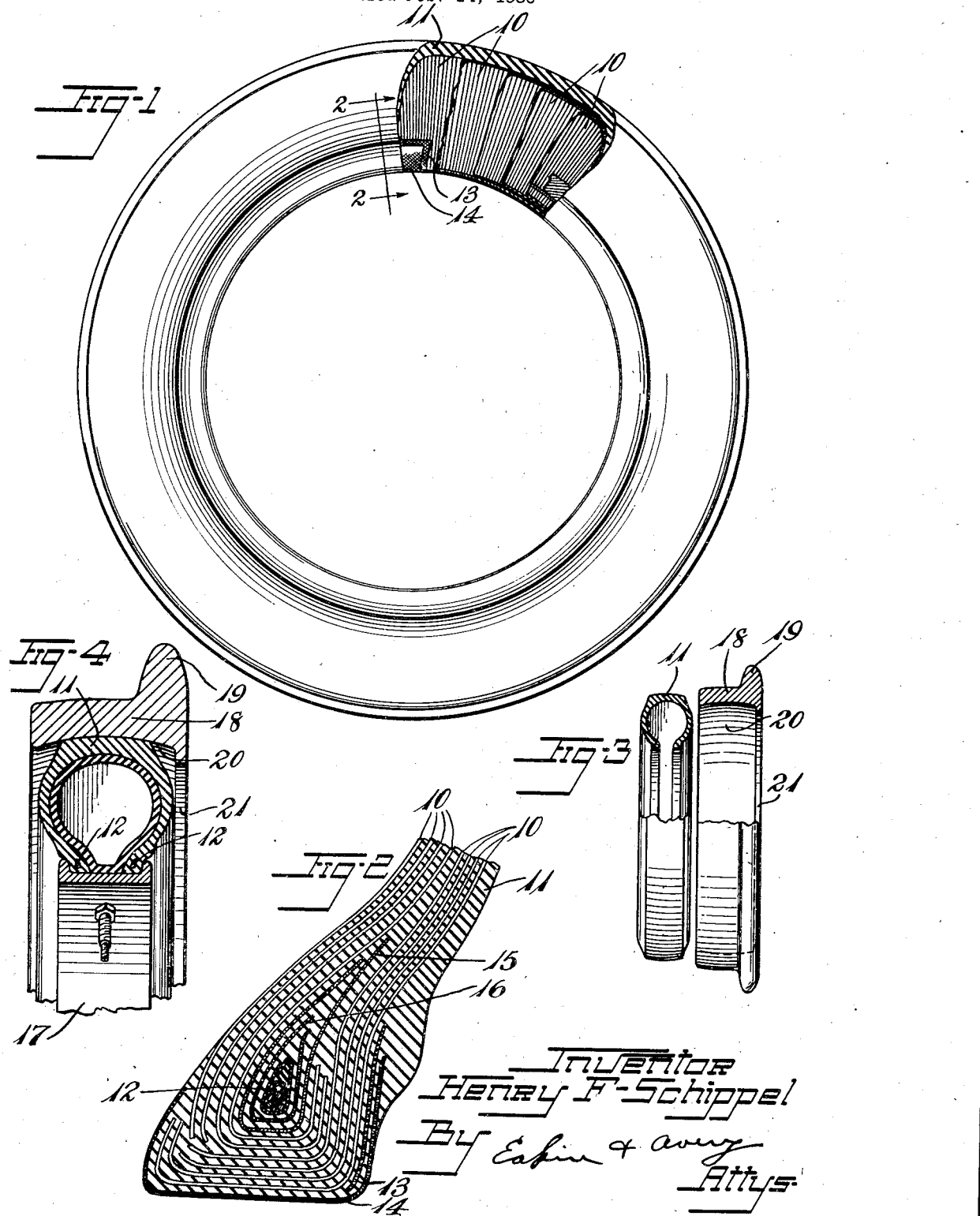

2,155,564

UNITED STATES PATENT OFFICE 2,155,564

WHEEL AND TIRE ASSEMBLY

Henry F. Schippel, Akron, Ohio, assignor to The
B. F. Goodrich Company, New York, N. Y., a
corporation of New York Application February 14, 1936, Serial No. 63,872

4 Claims. (Cl. 295—12)

This invention relates to wheel and tire assemblies.

Its chief objects are to provide in such an assembly a pneumatic tire of light and consequently inexpensive construction but adapted to withstand long and severe use; to provide for supporting of the load with low tire inflation and thus to make it unnecessary for the tire to be of heavy construction; to provide for the use in such an assembly of a tire having, at least in the greater part of its active portion, cords lying only in radial or approximately radial positions, so that the tire permissibly may have only a single ply of cord-reinforcement, for combining high strength with high flexibility, and at the same time providing against excessive side-sway of the vehicle which heretofore has been an incident of the use of such tires; to provide for effective transmission of accelerating and braking forces longitudinally of the tire and thus to avoid destructive localized sustention of such forces; to protect the tire with a metallic armor against punctures, without the weaknesses of construction which heretofore have resulted from the association of metal with rubber in the tire; to provide an improved pneumatic assembly adapted to run upon rails; and conveniently to provide against such amplitude of cushioning in relation to sprung and unsprung weights as to cause the assembly to be excessively subject to being derailed.

Of the accompanying drawing:

Fig. 1 is a side elevation, with parts sectioned and broken away, of a pneumatic tire adapted to be incorporated in a preferred embodiment of my invention.

Fig. 2 is a section on line 2—2 of Fig. 1.

Fig. 3 is an elevation of the pneumatic tire and a metal ring in which the tire is to be mounted.

Fig. 4 is a cross-section of the assembly.

Referring to the drawing, the pneumatic tire comprises a carcass of radially disposed rubberized cords 10, 10 and the usual tread and side wall rubber 11 and bead cores 12. The usual chafing strips 13, 14 of bias-cut square-woven fabric may be employed, as well as flipper strips 15, 16, which preferably are of bias-cut cord fabric.

While the tire here shown has several carcass plies of cord fabric, the number of plies can be reduced, by the use of larger cords, for increased flexibility of the carcass without reduction of strength.

Preferably the tire, mounted upon a rim 17, is mounted within a restricting metal tread-ring 18, which may be formed with a rail-flange 19, and held within the ring by inflating it within the ring, the ring frictionally contacting the tread of the tire with such resistance to slippage as to transmit accelerating and braking forces to the tread throughout the great circle of the tire and thus avoid destructive localized sustention of such forces. My invention is not wholly limited, however, to a metal ring for effecting that result, nor is it limited to a pneumatic tire having a smooth tread surface as in the case of the one here shown.

Preferably the metal ring is transversely concaved on its inner face 20, for such interfitting with the tread of the pneumatic tire as to provide ample security against lateral displacement, and the ring may be formed at a margin thereof with an internal flange 21 for strength and rigidity.

The general operation of the assembly, brought together in the relationship shown in Fig. 4, will be obvious, the assembly as there shown being adapted for use on rails.

In the running of the specific embodiment here shown, on rails or on a roadway, cushioning of the vehicle is provided by movement of the substantially rigid rim 17 as a whole with relation to the substantially rigid metal ring 18 as a whole, as distinguished from the localized tread-indentation of the ordinary tire at the position of ground contact, so that in the cushioning movement the pneumatic tire is required to deform throughout all parts of the wheel-circle, and it is this fact that makes the radial-cord feature of the tire of the utmost importance in the combination herein described, the radially disposed cords readily permitting appropriate deformation of the tire at its front and rear (at axle-height) whereas if the cords were oblique they would in the forward and rear quadrants of the wheel act as substantially non-yielding suspension members strongly resisting the cushioning movement of the rim 17 and thus would not only prevent desirably high cushioning movement but would also cause rapid destruction of the pneumatic tire by reason of localized sustaining of the forces imposed upon it by the vehicle.

As the cushioning movement of the rim 17 with relation to the ring 18 involves deformation of the pneumatic tire throughout the entire wheel-circle, very low air pressure can be employed, with consequently low strain upon the pneumatic-tire wall and with corresponding lightness and economy of construction. By the same token, a high-modulus cushioning, if it is desired, can be obtained by the use of only moderate inflation pressure.

I claim:

1. A wheel and tire assembly comprising, in combination, a pneumatic tire having stretch-resisting reinforcing elements in the body thereof and having all the reinforcing elements in the greater part of the active portion of the tire disposed in substantially radial positions only, and substantially inextensible means for transmitting accelerating and braking forces along the tread portion of the tire, said reinforcing elements by virtue of their solely radial disposition in the tire being effective to permit the descent of the bead portion of the tire with relation to the tread portion of the tire under load without substantial downward pull by said elements on the tread portion of the tire at the fore and aft, axle-high positions of the tread.

2. A wheel and tire assembly comprising, in combination, a cord-reinforced pneumatic tire mounted on a rim and having all the reinforcing elements including the cords in the greater part of the active portion of the tire disposed in substantially radial positions only, and a metal ring for transmitting accelerating and braking forces along the tread portion of the tire, said reinforcing elements by virtue of their solely radial disposition in the tire being effective to permit the descent of the rim with relation to the tread portion of the tire under load without substantial downward pull by said elements on the tread portion of the tire at the fore and aft, axle-high positions of the tread.

3. A wheel and tire assembly comprising, in combination, a pneumatic tire mounted on a rim, said tire having stretch-resisting reinforcing elements in the body thereof and having all the reinforcing elements in the greater part of the active portion of the tire disposed in substantially radial positions only, and a metal ring for transmitting accelerating and braking forces along the tread portion of the tire, the tread portion of the tire being held in frictional engagement with the inner face of the ring by the inflation pressure, and the tread portion of the tire being maintained in substantially non-scuffing relation with said inner face of the ring at the fore and aft, axle-high positions thereof during descent of the rim with relation to said ring under load by virtue of the solely radial disposition of said reinforcing elements effective to permit the descent of the rim without substantial downward pull by said elements on the tread portion of the tire at said positions.

4. A wheel and tire assembly comprising, in combination, a cord-reinforced pneumatic tire mounted on a rim and having all the reinforcing elements including the cords in the greater part of the active portion of the tire disposed in substantially radial positions only, and a flanged rail-engaging metal ring for transmitting accelerating and braking forces along the tread portion of the tire, the tread portion of the tire being held in frictional engagement with the inner face of the ring by the inflation pressure, and the tread portion of the tire being maintained in substantially non-scuffing relation with said inner face of the ring in the fore and aft, axle-high positions thereof during descent of the rim with relation to said ring under load by virtue of the solely radial disposition of said reinforcing elements effective to permit the descent of the rim without substantial downward pull by said elements on the tread portion of the tire at said positions.

HENRY F. SCHIPPEL.